July 31, 1951  R. POLK, SR., ET AL  2,562,818
FRUIT PEELING APPARATUS
Filed Oct. 25, 1946  3 Sheets-Sheet 1
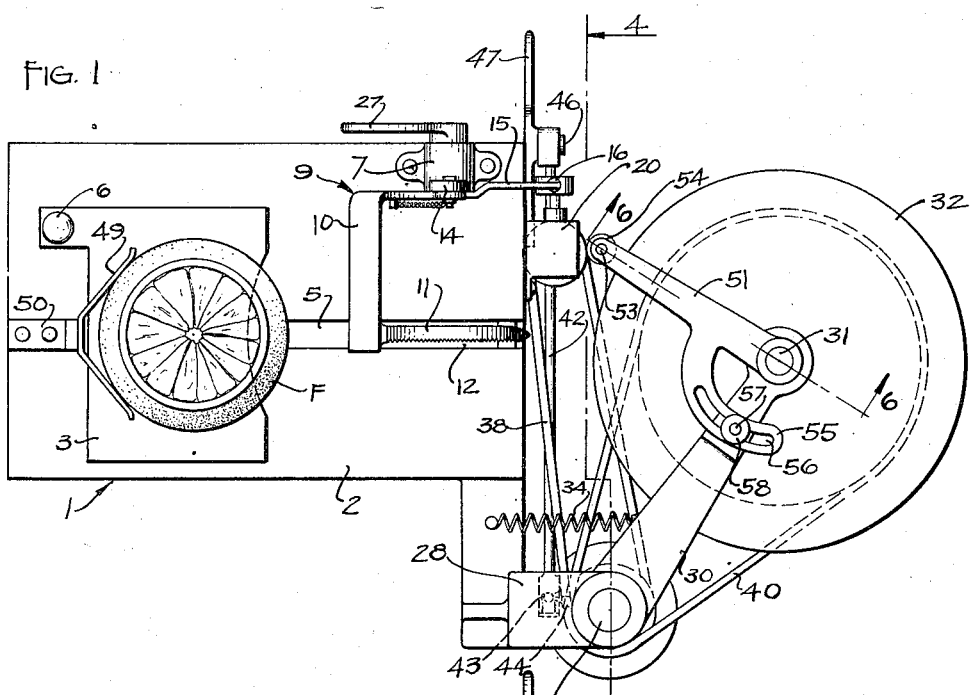
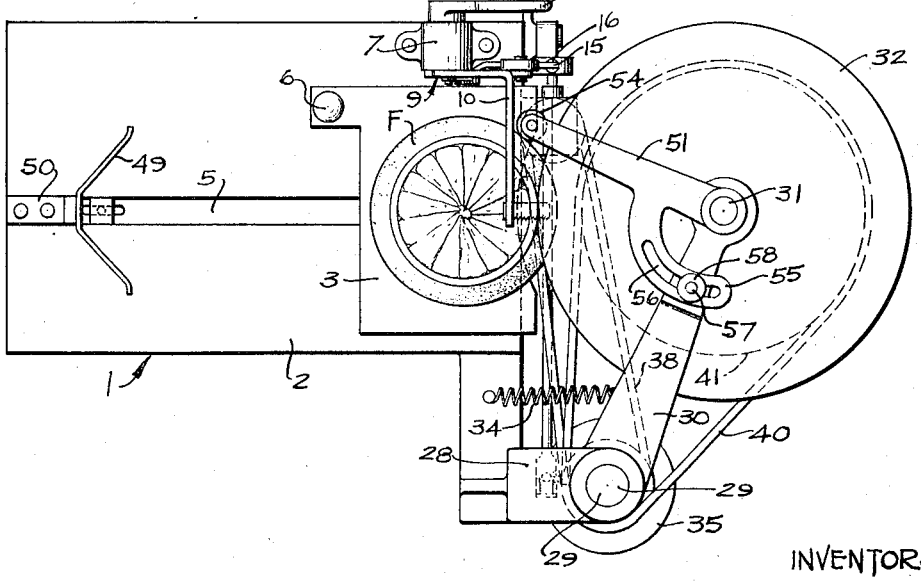
INVENTORS
RALPH POLK, SR. & RALPH POLK, JR.
BY
Semmes, Keegin, Robinson & Semmes
ATTORNEYS July 31, 1951 R. POLK, SR., ET AL 2,562,818
FRUIT PEELING APPARATUS
Filed Oct. 25, 1946 3 Sheets-Sheet 2

INVENTORS
RALPH POLK, SR. & RALPH POLK, JR.
BY
Semmes, Keogin, Robinson & Semmes
ATTORNEYS July 31, 1951  R. POLK, SR., ET AL  2,562,818
FRUIT PEELING APPARATUS
Filed Oct. 25, 1946  3 Sheets-Sheet 3

INVENTORS
RALPH POLK, SR. & RALPH POLK, JR.
BY
ATTORNEYS

Patented July 31, 1951

2,562,818

UNITED STATES PATENT OFFICE 2,562,818

FRUIT PEELING APPARATUS

Ralph Polk, Sr., Miami, and Ralph Polk, Jr., Tampa, Fla., assignors to The Polk Development Company, Tampa, Fla., a copartnership Application October 25, 1946, Serial No. 705,694

10 Claims. (Cl. 146—3)

This invention relates to the peeling of fruit and more particularly to a method and apparatus for freeing the meat as a substantial whole from the peel and the segment membrane wall adjacent thereto, of citrus fruit, such as grapefruit.

Various peeling methods, both manual and mechanical, are employed in the citrus fruit industry to prepare the fruit for subsequent operations such, for example, as dividing the fruit into its membrane, free natural segments, known as "sectionizing." The methods usually employed, however, have not been entirely satisfactory because of the time and expert labor required for hand peeling, and because of the failure of the peeling machines heretofore provided to satisfactorily remove all of the albedo and the membrane walls of the segments adjacent thereto (necessary for sectionizing the fruit) without substantial waste.

One method of peeling citrus fruit, particularly grapefruit, for sectionizing, consists of first "stubbing" the fruit, or slicing off cap portions of the peel and a small amount of the ends of the segments from opposite poles of the fruit and then cutting the remaining band of the peel and outer membrane from the meat. We have found that this latter operation may be performed mechanically by inserting a blade having a longitudinal curvature corresponding substantially to the curvature of the inner peel surface, through the meat of the stubbed fruit just inside the peel, and rotating the blade about an axis parallel to the polar axis of the fruit in a circuit just inside the peel.

Several problems created principally by the nature of the fruit are encountered in performing this operation, however. For example, fruit are of various sizes and this cross sectional contour is very seldom perfectly round, which precludes rotating the curved blade at a fixed radius from its rotational axis without waste of the fruit or cutting into the peel. Then too, the core of the fruit is very seldom in its central axis which creates a problem in centering the fruit with respect to the axis of rotation of the curved blade. Again, the peel thickness of fruit and the cross sectional peripheral contour of the segments vary with the maturity of the fruit, the peel becoming thinner and the peripheral contour of the segments becoming less scolloped as the fruit matures. The juice cells adhere strongly to the membrane walls in the junctures between the radial and outer membrane walls making sectionizing difficult unless this portion is removed with the outer membrane. Removal of just enough of the radial portion of the membrane, while still avoiding waste of the meat, requires accurate regulation of the depth of cut from the peel. Still another problem encountered is in holding or supporting the stubbed fruit while cutting around inside the peel so that the peel contour is not distorted from the curvature of the curved blade.

It is therefore an object of this invention to provide a method and apparatus for peeling fruit, more particularly for removing the meat portion as a substantial whole from the peel portion of stubbed citrus fruit, which offers a solution to the above and other problems.

Another object of the invention is to provide a method and apparatus for peeling citrus fruit in which the meat is severed from the peel of a stubbed fruit cleanly and at a predetermined depth from the peel, following the peel contour regardless of the shape thereof.

Still another object of the invention is to provide a method and apparatus of the above character which is readily adaptable to a variety of fruit sizes and shapes without first grading the fruit.

A further object of the invention is to provide a method and apparatus of the above character in which the natural peel curvature is substantially maintained during the operation of severing the meat therefrom.

A still further object of the invention is to provide a method and apparatus which lends itself to either full automatic or semi-automatic operation, which is efficient, in which the apparatus consists of few parts easily constructed, operated and maintained, and which does not require particularly skilled operators.

To accomplish the above and other important objects, the invention consists in the parts and combinations hereinafter set forth, with the understanding that various changes may be made therein, by those skilled in the art, without departing from the spirit of the invention.

In the accompanying drawings there are shown means for carrying the invention into practical effect. It is to be understood however, that the mechanism illustrated is by way of example only, and the invention is not to be limited to the particular mechanism shown. It is to be understood also, that the invention is directed to rapid production methods and means for mechanically peeling the fruit and is not to be confused with hand methods and devices such, for example, as disclosed in Patent 1,452,930, issued to Ralph Polk, April 24, 1923.

In the drawings:

Figure 1 is a plan view of an embodiment of machine according to this invention with the operating parts in an initial position preparatory to severing the meat from the peel of a stubbed grapefruit.

Figure 2 is a view similar to Figure 1 but showing the parts in positions occupied during the severing operation.

Figure 3:
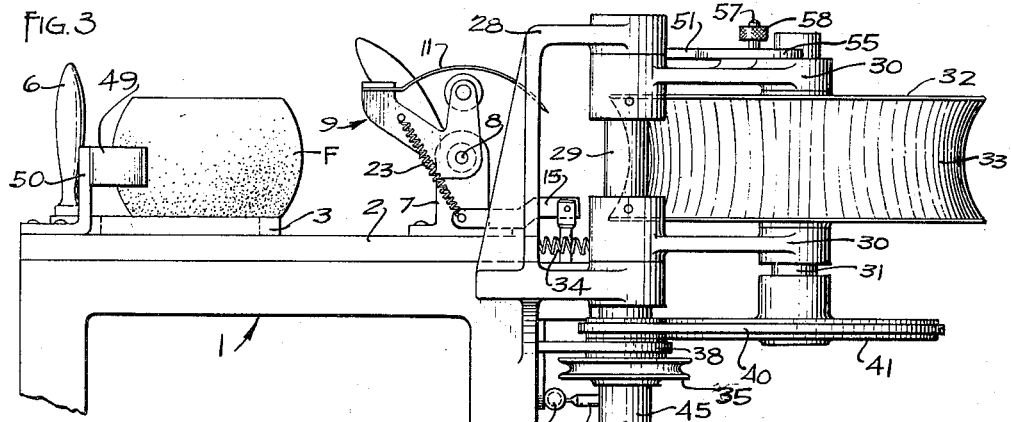
Figure 3 is a view in side elevation of the machine, partly broken away, with the parts in the positions shown in Figure 1.

Generally the invention comprises stubbing whole fruit, such as grapefruit, by slicing off polar caps along substantially parallel planes to expose the meat of the fruit, and inserting a blade curved to fit the inner surface of the peel of an average fruit, polar-wise through the meat with the convex face of the blade lying adjacent the inner surface of the peel. A rotating wheel having a peripheral groove, the cross sectional contour of which is concentric with the curvature of the blade, is brought into spring pressed tangential engagement with the outer surface of the peel immediately opposite the blade to rotate the fruit or feed the peel relatively to the blade and thereby sever the meat as a substantially naturally shaped whole from the peel. During this latter operation, the blade preferably is given a rather rapid oscillating motion along the arc of its curvature to produce a sawing action and make a clean cut through the juice cells and radial membrane walls.

The grooved periphery of the pressure wheel serves not only to rotate the fruit relatively to the cutting blade, but because of its cross sectional contour, serves to support the peel against distortion and maintain its longitudinal curvature substantially to that of the curved blade. While the pressure exerted on the peel between the wheel and blade provides a substantial support for the fruit during this cutting operation, it is convenient to operate with the fruit positioned on a vertical axis, and an additional support is provided by a flat plate perpendicular to the axis of the wheel and on which the fruit is placed with one stubbed end resting thereon to maintain the fruit axis parallel with that of the wheel.

Preferably, means are provided for regulating the depth of cut from the inner peel surface. This is easily and accurately accomplished by means of a small idle roller adjacent the periphery of the wheel and adjustable about the wheel axis toward and away from the blade. This idle roller engages the outer peel surface and positions the center of the fruit laterally toward or away from the center line passing through the knife and the axis of the wheel, which has the effect of moving the line of tangency between the periphery of the wheel and peel surface which varies the angular relationship between the inner peel surface and the face of the blade to vary according to the distance between the cutting edge of the blade and the inner peel surface.

Describing the apparatus shown in the drawings more particularly, a table 1 having a flat top 2 carries a flat plate 3 for sliding movement longitudinally thereon. The plate 3 may be guided such as by means of a T-shaped key 4, secured to the bottom face of the plate and riding in a T-slot 5 which extends the length of the table. A handle 6, offset to one side and to the rear of the plate, may be provided for moving it.

At one side of the table top 2, adjacent the forward end thereof, is a bearing block 7 in which is rotatably journalled a short horizontal shaft 8. The end of the shaft 8 toward the center of the table, has secured thereto a bell crank member 9, one arm 10 of which is bent at right angles toward the center of the table. To the end of the arm 10 is secured one end of a longitudinally curved blade 11 which lies in a vertical plane passing through the longitudinal center of the table 2. The blade 11 has a longitudinal and preferably serrated cutting edge 12, an arc of curvature corresponding substantially to the longitudinal curvature of the inner peel surface of an average fruit with the center of curvature of the arc lying substantially in the rotational axis of the shaft 8.

On the outer end of the other arm 13 of the bell crank 9, is mounted a roller 14 which, in the fruit cutting position of the blade 11, is adapted to engage a lever 15 pivotally attached at one of its ends to the side face of the bearing 7. The free end of the lever 15 has an attachment with one end of a connecting rod 16 the opposite end of which is formed into a strap 17 in which is adapted to rotate an eccentric 18. The eccentric 18 is carried on a short horizontal shaft 19, rotatably journalled in a gear box 20 and operatively connected through a pair of miter gears 21 (see Figure 4) with a vertical shaft which carries a pulley 22.

Figure 5:
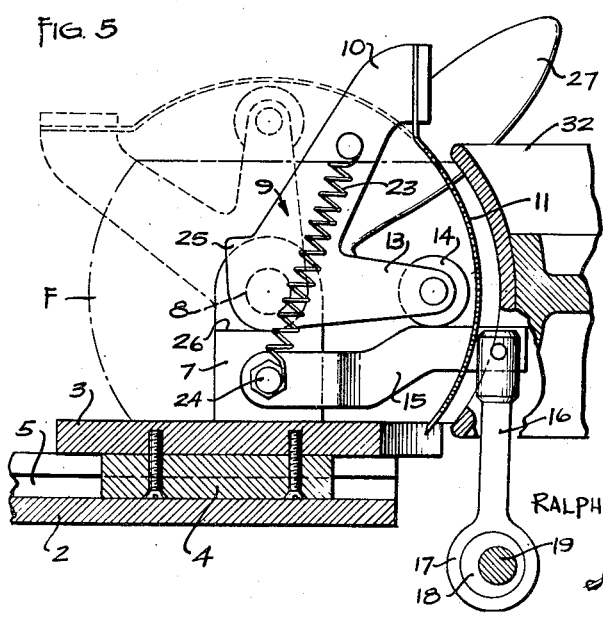
Figure 5 is a vertical longitudinal sectional view through the fruit supporting plate and forward portion of the machine table showing the cutting blade and its associated parts in fruit cutting position.

To the arm 10 of the bell crank 9 is attached one end of a helical tensioning spring 23, the opposite end of which is attached, such as by means of a stud 24, to the bearing block 7 below the axis of rotation of the shaft 8 and in a vertical plane intersecting said axis. As seen in Figures 3 and 5, the spring 23 urges the bell crank lever 9 either in a counterclockwise direction or a clockwise direction depending upon which side of the axis of the shaft 8 the upper end of the spring is located and thus resiliently urges the blade 11 to an inoperative position away from the fruit to be operated on, as seen in Figure 3, or to a fruit cutting position, as shown in Figure 5, where the roller 14 rests on the lever 15. In order to limit the extent of movement of the bell crank in the inoperative position of the blade, a projection 25 is formed on the bell crank 9 for engagement with a stop or shelf 26 formed on the bearing 7. The outer end of the shaft 8 may be provided with a handle 27 by means of which the blade may be moved from its operative to inoperative position and vice versa.

To the forward end of the table 1 is attached a laterally offset bracket 28 in which is rotatably journalled a vertical shaft 29. This shaft has pinned or otherwise secured thereto, a pair of parallel horizontal arms 30 in the free ends of which is journalled a vertical shaft 31. Secured to the shaft 31, between the arms 30, is a wheel 32 having a grooved and preferably roughened periphery 33. The width of the wheel 32 is substantially equal to the width of a stubbed fruit and the transverse curvature of the groove is concentric with the curvature of the blade 11 and corresponds substantially to the outer peel curvature of an average size fruit. Connecting one of the arms 30 with the bracket 28 is a tensioning spring 34 which urges the wheel 32 about the axis of the shaft 29 in a direction toward the forward end of the table 1 and the blade 11.

For operating the driving parts of the machine, i. e., the wheel 32 and the eccentric 18, the lower end of the shaft 29 has rotatably mounted thereon a three-groove jack pulley 35, one groove 36 of which is adapted to receive a driving belt from a motor pulley or other source of power (not shown). A second groove 37 of the pulley 35 carries a belt 38 which passes around and drives the small pulley 22 for driving the eccentric 18 while the third groove 39 of the pulley 35 carries a belt 40 which passes over a relatively large pulley 41 secured to the lower end of the wheel shaft 31.

Figure 4:
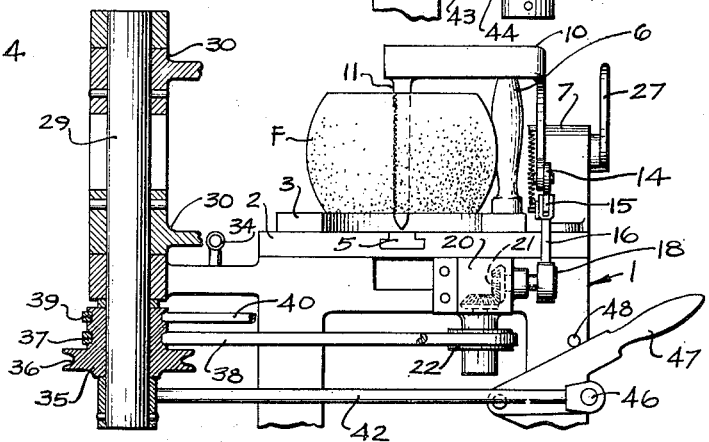
Figure 4 is a cross sectional view taken along the line 4—4 of Figure 1, looking in the direction of the arrows.
Figure 6:
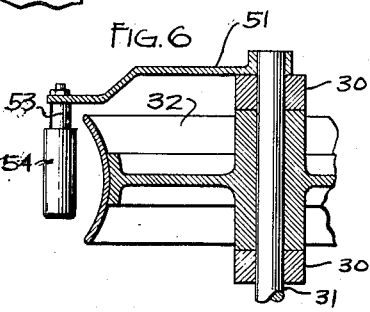
Figure 6 is a fragmental transverse sectional view taken along the line 6—6 of Figure 1, looking in the direction of the arrows.

From the above it will be seen that the wheel 32 is constantly driven and is urged to an operative position in a direction toward the table 1. It is desirable however, that except when a fruit is being operated upon, that the wheel be maintained in a retracted or inoperative position somewhat away from the blade 11. This may be conveniently accomplished such as illustrated in Figures 1 and 3 by means of a rod 42, one end of which has a universal connection 43 with a radial arm 44 carried by a collar 45 secured to the shaft 29. The opposite end of the rod 42 has a pivotal connection 46 with a hand lever 47 which, in turn, is pivotally connected to the table 1. Rocking the hand lever 47 about its pivot will impart a rotation to the shaft 29 and a consequent movement of the wheel 32 toward and away from the table. It is to be noted however, that the point of connection 46 of the rod 42 with the lever is on the side of the lever pivot away from the arm 44 so that, except when the rod is in direct line with the pivotal axis of the lever, the spring 34 will tend also to rock the lever either in a clockwise or counterclockwise direction. As seen in Figure 4, movement of the lever in a counterclockwise direction is blocked such as by a stop pin 48 and when in this position the wheel will be held in its retracted position against the tension of the spring 34. The lever is free to move in the opposite direction, however, and when moved sufficiently for the point 46 to move past the line of pull of the rod passing through the pivotal axis of the lever, the spring 34 will move the wheel to its operative position.

In operation, a stubbed fruit, that is, one with opposite polar cap portions sliced off on parallel planes, as indicated at F, is placed on the plate 3 with the plate at the rear of the table, as shown in Figure 1. To aid in centering the piece of fruit on the plate, there may be provided a V-shaped strip 49 attached by means such as an angle bracket 50, to the rear of the table to overlie the plate 3 in its rear position. The plate is then moved forwardly under the knife 11 and the operator inserts the knife downwardly through the meat of the fruit just inside the peel by means of the handle 27. This inserted position of the knife is shown in Figure 5 where it will be noted that the roller 14 on the end of the bell crank 9 is tensioned downwardly against the arm 15 by means of the spring 23. This arm 15 is being rapidly oscillated about its pivot 24 by means of the rotating eccentric 18 and connecting rod 16 and as a consequence, the blade 11 in this position is given a rapid oscillatory motion about the pivot 8 or, in other words, along the arc of its curvature.

The operator next brings its grooved periphery of the revolving wheel 32 into spring pressed tangential engagement with the outer peel surface of the fruit by manipulation of the lever 47, as above set forth, which will rotate the fruit with respect to the oscillating blade 11 and sever the meat from the peel. It is to be noted that during this operation the movement of the fruit is guided solely by its peel contour, the back of the curved blade 11 engaging the inner peel surface and the grooved periphery of the wheel 32 engaging the outer peel surface, so that, regardless of irregularities in the cross sectional shape of the fruit or off center cores, the blade will follow the peel contour. It is to be noted also, that the cross sectional curvature of the groove 33, cooperating with the curvature of the blade, tends to prevent longitudinal distortion of the fruit peel during the cutting operation.

It might be pointed out that the tension of the spring 34 should be sufficient to provide a good driving engagement of the wheel with the fruit. This will not be great because the sawing action imparted the blade 11 offers slight resistance to the passage of the blade through the meat. The spring 23, however, should exert a sufficient force on the bell crank 9 to overcome any counter rotating force thereon about its axis 8 exerted by the pressure of the wheel 32.

After the fruit has been rotated at least one revolution and the meat has been severed from the peel, the wheel 32 is first retracted to its inoperative position by the lever 47, the blade withdrawn by returning the bell crank 9 to its initial position shown by dotted lines in Figure 5, and the plate 3 moved back from under the knife mechanism. The fruit may then be removed from the plate, the severed meat removed from the band of peel and another stubbed fruit centered on the plate.

The actual removal of the meat, as severed from the band of peel in the manner above described, forms no part of this invention and may be accomplished in any convenient manner. For example, after the fruit is removed from the plate 3, the band of peel may be slit longitudinally and the meat removed. It is to be noted, however, that the spongy albedo layer of most citrus fruit is rather thick and compressible and it has been found in practice that the severed meat in such fruit may be pushed through one of the open ends of the band of peel without substantial mutilation of the meat or splitting of the peel.

The above described mechanism will be found adequate for operating on most fruit, with the cutting edge of the blade 11 beveled from the back or convex face toward the inner or concave face, it will be found that the wheel 32 will press the fruit peel against the back face of the blade and the blade will cut around the fruit just inside the outer membrane walls of the segments.

Under certain conditions, and for certain fruit, however, it may be desirable to make the cut further inward from the peel. A simple but accurate means for regulating the depth of cut from the inner peel surface made by the blade 11 is illustrated in the drawings and constitutes a part of this invention. These regulating means comprise essentially an arm 51 carried by the upper end of the shaft 31 for rotary adjustment about the axis thereof, and extending slightly beyond the periphery of the wheel 32. The outer end of the arm 51 carries a depending stud 53 on which is rotatably mounted an idle roller 54 closely adjacent the periphery of the wheel. The arm 51 is provided with an arcuate, lateral offset 55 which has an arcuate slot 56 therein. A screw threaded stud 57 carried by the upper arm 30 passes through the slot 56 and is fitted with a thumb nut 58 which clamps the offset 55 into engagement with the arm 30 and thereby secures the arm 51 in a predetermined angular relationship with the arm 30. Thus, it will be seen that by adjusting the angular position of the arm 51 with respect to the arm 30, the roller 54 may be adjusted closer to or farther from the blade 11 when the blade and wheel are in operative positions.

Figure 7:
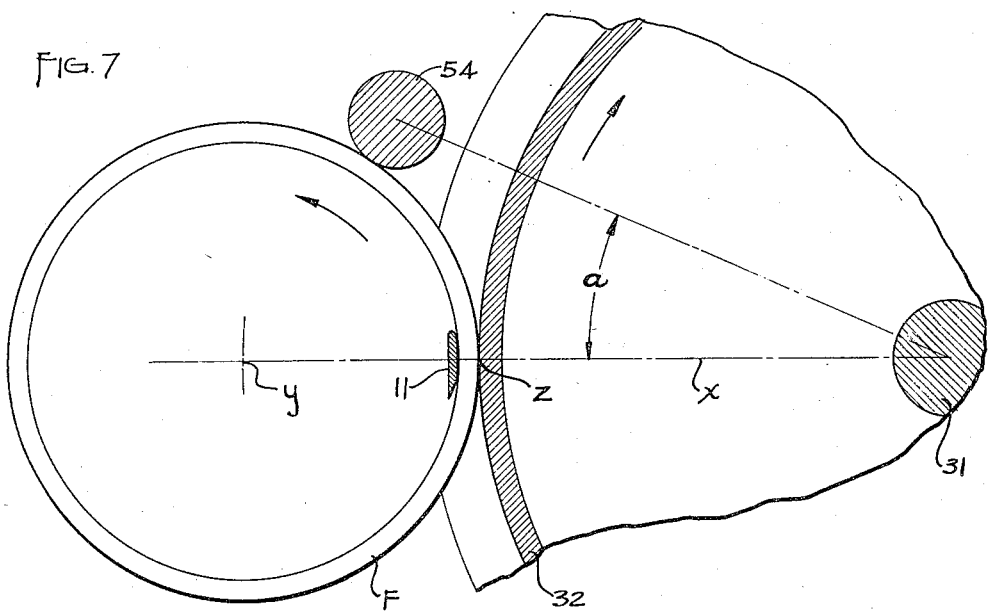
Figure 7 is a diagrammatic view showing the relative relationship between the cutting blade and a depth of cut regulating mechanism, for making a cut relatively close to the peel.

Referring now to Figure 7, it will be seen that with roller 54 adjusted to an angle A with the center line X passing through the wheel shaft 31 and center of the blade 11, when the wheel 32 is moved into engagement with the fruit F the roller will have no displacing action on the fruit. In other words, the center of the fruit intersects the center line X, or the line of tangency Z between the periphery of the wheel and the peel surface coincides with the line X. In this position of the roller 54, the whole back face of the blade 11 will engage the inner peel surface and the cut will be made close thereto as the fruit is revolved with the cutting edge beveled as shown, the cut will be spaced radially inwardly from the inner peel surface a distance equal to the thickness of the blade.

Figure 8:
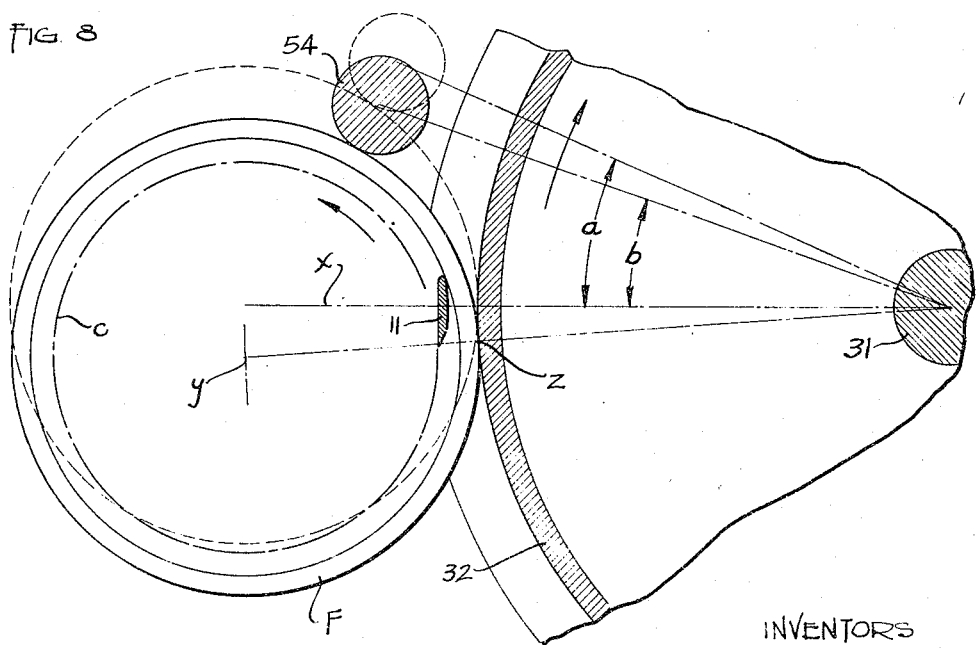
Figure 8 is a view similar to Figure 7, but showing an adjusted position of the regulating mechanism, for making a cut spaced inwardly from the peel.

If the roller 54 is moved closer to the blade 11, however, as indicated by the angle B in Figure 8, it will be seen that as the wheel 32 and roller are moved toward the fruit X, the roller will engage the fruit first and displace the line of tangency Z away from the line X toward the cutting edge of the blade. In this position, it will be noted that the peel surface is no longer parallel with the face of the knife but at an angle thereto and with the back edge of the blade only engaging the inner peel surface and the cutting edge spaced inwardly therefrom so that now the cut will be made inwardly from the peel as indicated by the dot-dash line C.

From the foregoing it will be seen that the invention provides a method and apparatus for rapidly and cleanly severing the meat as a substantial and unmutilated whole from the peel of citrus fruit. The apparatus is simple and easy to operate and will not require particular skill. It will handle fruit regardless of size, and the cut will follow the contour of the peel at a predetermined distance from the peel regardless of irregularities in peel contour. By means of the depth of cut regulator, great accuracy in gauging the depth of cut may be obtained.

While the machine is shown by way of example as being semi-automatic in operation, it will be understood that it adapts itself also to full automatic operation by the use of well known driving and synchronizing mechanism for operating the several parts shown and described to be operated by hand.

We claim:

1. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, driving means for the fruit having a movable surface engageable tangentially with the outer peel surface directly opposite the blade, means urging said surface into pressed engagement with the outer peel surface, and other means for moving said surface transversely of the blade to move the band of peel equatorwise relative to the blade and sever the band of peel from the meat circumferentially about the meat adjacent the inner peel surface along the line of curvature of the blade.

2. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, a wheel mounted on a movable support for rotation about an axis parallel with the polar axis of the fruit, said wheel having a circumferential surface engageable tangentially with the outer peel surface directly opposite said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

3. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, a wheel mounted on a movable support for rotation about an axis parallel with the polar axis of the fruit, said wheel having a circumferentially grooved periphery engageable with the outer peel surface, said groove having a cross sectional contour corresponding to the curvature of said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

4. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, means mounting the blade for reciprocating movement about the center of curvature of the blade, means for imparting substantially rapid reciprocations of the blade, driving means for the fruit having a movable surface engageable tangentially with the outer peel surface directly opposite the blade, means urging said surface into pressed engagement with the outer peel surface, and other means for moving said surface transversely of the blade to move the band of peel equatorwise relative to the blade and sever the band of peel from the meat circumferentially about the meat adjacent the inner peel surface along the line of curvature of the blade.

5. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, means mounting the blade for reciprocating movement about the center of curvature of the blade, means for imparting substantially rapid reciprocations of the blade, a wheel mounted on movable support for rotation about an axis parallel with the polar axis of the fruit, said wheel having a circumferential surface engageable tangentially with the outer peel surface directly opposite said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

6. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, means mounting the blade for reciprocating movement about the center of curvature of the blade, means for imparting substantially rapid reciprocations of the blade, a wheel mounted on a movable support for rotation about an axis parallel with the polar axis of the fruit, said wheel having a circumferentially grooved periphery engageable with the outer peel surface, said groove having a cross sectional contour corresponding to the curvature of said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

7. Apparatus for severing the meat as a substantial whole from the band of peel of stubbed citrus fruit comprising a support for the fruit having a flat surface upon which one stubbed end of the fruit rests for free movement thereon, a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, a wheel mounted on a movable support for rotation about an axis parallel with the polar axis of the fruit, said wheel having a circumferential surface engageable tangentially with the outer peel surface directly opposite said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

8. Apparatus for severing the meat as a substantial whole from the band of peel of stubbed citrus fruit comprising a support for the fruit having a flat surface upon which one stubbed end of the fruit rests for free movement thereon, a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, a wheel mounted on a movable support for rotation about an axis parallel with the polar axis of the fruit, said wheel having a circumferentially grooved periphery engageable with the outer peel surface, said groove having a cross sectional contour corresponding to the curvature of said blade, resilient means urging the support toward the blade to press the surface of the wheel into tangential engagement with the outer peel surface, and means for rotating the wheel to move the peel equatorwise relative to the blade and sever the band of peel from the meat circumferentially about the meat adjacent the inner peel surface along the line of curvature of the blade.

9. Apparatus for severing the meat as a substantial whole from the band of peel of stubbed citrus fruit comprising a blade having a longitudinal face curvature corresponding substantially to the longitudinal curvature of the inner peel surface of an average fruit, means to insert the blade in the meat of the fruit extending in a fixed arc longitudinally of the fruit with the convex face of the blade adjacent the inner peel surface, a wheel mounted on a movable support for rotation about an axis parallel with the polar axis of the fruit, said wheel having a circumferential surface engageable tangentially with the outer peel surface directly opposite said blade, resilient means urging the support toward the blade to press the surface of the wheel into tangential engagement with the outer peel surface, means for rotating the wheel to rotate the fruit equatorwise relative to the blade and sever the band of peel from the meat circumferentially about the meat adjacent the inner peel surface along the line of curvature of the blade, and an abutment member carried by the wheel support radially spaced from the circumferential surface of the wheel and engageable with said outer peel surface coincidentally therewith in spaced relation to the line of tangency of the wheel surface and outer peel surface in the direction of rotation of the fruit to determine said line of tangency with respect to said blade and thereby determining the depth of cut from the inner peel surface made by said blade.

10. Apparatus according to claim 9 including an arm mounted for pivotal adjustment about the axis of the wheel and carrying said abutment member, and means for adjusting said arm to adjust said abutment member circumferentially of the wheel.

RALPH POLK, Sr.
RALPH POLK, Jr.

REFERENCES CITED

The following references are of record in the file of this patent:

UNITED STATES PATENTS

| Number | Name | Date |
|---|---|---|
| 1,277,148 | Starr | Aug. 27, 1918 |
| 1,452,930 | Polk | Apr. 24, 1923 |
| 1,463,233 | Ulrich | July 31, 1923 |
| 1,631,854 | Carroll | June 7, 1927 |
| 1,734,534 | Shields | Nov. 5, 1929 |
| 1,920,095 | McCall | July 25, 1933 |
| 2,015,666 | Ewald | Oct. 1, 1935 |
| 2,210,974 | De Prume | Aug. 13, 1940 |